(12) United States Patent
Bhubhut et al.

(10) Patent No.: US 11,328,268 B1
(45) Date of Patent: May 10, 2022

(54) SYSTEM FOR VERIFYING DOCUMENTS USING MIXED REALITY APPLICATIONS

(71) Applicant: Bottomline Technologies Ltd., Or Yehuda (IL)

(72) Inventors: Shay Bhubhut, Ramat Gan (IL); Richard A Baker, Jr., West Newbury, MA (US); Piyush Gupta, Panchkula (IN)

(73) Assignee: Bottomline Technologies Ltd., Or Yehuda (IL)

( * ) Notice: Subject to any disclaimer, the term of this patent is extended or adjusted under 35 U.S.C. 154(b) by 97 days.

(21) Appl. No.: 17/084,177

(22) Filed: Oct. 29, 2020

Related U.S. Application Data

(63) Continuation-in-part of application No. 17/012,405, filed on Sep. 4, 2020.

(51) Int. Cl.
*G06Q 20/00* (2012.01)
*G06Q 20/04* (2012.01)
(Continued)

(52) U.S. Cl.
CPC ..... *G06Q 20/0425* (2013.01); *G02B 27/0172* (2013.01); *G06F 16/5846* (2019.01); *G06F 16/955* (2019.01); *G06Q 20/02* (2013.01); *G06Q 20/108* (2013.01); *G06Q 20/40145* (2013.01); *G06Q 30/04* (2013.01); *G06Q 40/02* (2013.01); *G06V 20/20* (2022.01); *G06V 30/40* (2022.01); *G06V 40/33* (2022.01); *G07D 7/2016* (2013.01); *G02B 2027/014* (2013.01); *G02B 2027/0138* (2013.01); *G02B 2027/0178* (2013.01); *G06F 3/0482* (2013.01)

(58) Field of Classification Search
USPC ........................................ 705/35, 42
See application file for complete search history.

(56) References Cited

U.S. PATENT DOCUMENTS 6,195,452 B1 2/2001 Royer
7,584,128 B2 9/2009 Mason et al.
(Continued)

FOREIGN PATENT DOCUMENTS

EP 3882838 A1 * 9/2021 ........... G06Q 20/401

*Primary Examiner* — William E Rankins
(74) *Attorney, Agent, or Firm* — Richard A. Baker, Jr.

(57) ABSTRACT

Disclosed is a system for authenticating checks using a mixed reality environment. The system includes a financial instrumentation central database for storing financial and identification data related to the checks, and a reality glasses coupled to the financial instrumentation central database. The reality glass includes a memory unit for storing a plurality of modules, a camera to capture the image of the check, a reality display; and a wearable processor coupled to the memory unit for processing the stored plurality of modules. The wearable processor is coupled to the financial instrumentation central database, to the camera to process captured images of the check. The plurality of modules includes a first level authentication module to authenticate a bank routing number, a second level authentication module to authenticate an account number on the check captured by the camera, a third level authentication module to authenticate an appropriate amount on the check, and a fourth level authentication module to authenticate a signature style on the check.

20 Claims, 3 Drawing Sheets

(51) Int. Cl.
| | |
|---|---|
| *G06F 16/583* | (2019.01) |
| *G06Q 40/02* | (2012.01) |
| *G06Q 20/02* | (2012.01) |
| *G06Q 20/40* | (2012.01) |
| *G06Q 30/04* | (2012.01) |
| *G06Q 20/10* | (2012.01) |
| *G02B 27/01* | (2006.01) |
| *G07D 7/20* | (2016.01) |
| *G06F 16/955* | (2019.01) |
| *G06V 20/20* | (2022.01) |
| *G06V 30/40* | (2022.01) |
| *G06V 40/30* | (2022.01) |
| *G06F 3/0482* | (2013.01) |

(56) References Cited

U.S. PATENT DOCUMENTS

| | | | |
|---|---|---|---|
| 8,538,124 | B1 | 9/2013 | Harpel et al. |
| 8,959,033 | B1 * | 2/2015 | Oakes, III ............ G06V 40/172 |
| | | | 382/137 |
| 9,811,650 | B2 | 11/2017 | Todeschini |
| 10,540,491 | B1 | 1/2020 | Martinez et al. |
| 10,586,220 | B2 | 3/2020 | Adams et al. |
| 10,607,230 | B2 | 3/2020 | Adams et al. |
| 2017/0061182 | A1 * | 3/2017 | De Muelenaere . G06K 7/10881 |
| 2020/0279275 | A1 | 9/2020 | Kelly et al. |

\* cited by examiner

Your Name
1234 Street Address
City, State Zip

DATE [today's date]

PAY TO THE [entity you are paying]
ORDER OF

[amount written out in words]

$ [amount]

DOLLARS

Security Features Details on Back

Bank Name

MEMO [explanatory note]

[your signature]

SYSTEM FOR VERIFYING DOCUMENTS USING MIXED REALITY APPLICATIONS

CROSS-REFERENCE TO A RELATED APPLICATION

The present application is a Continuation Application of U.S. patent application Ser. No. 17/012,405, filed Sep. 4, 2020, and entitled 'A system for verifying a user using mixed reality applications', the entire contents of which are hereby incorporated by reference.

BACKGROUND OF THE INVENTION

Field of the Invention

The present invention generally relates to a system for verifying documents using mixed reality applications and more particularly relates to a system for verifying documents using a multi-step authentication process in a mixed reality environment.

Description of Related Art

Both electronic and manual document checking can be effective mechanisms for verifying the identity of customers. However, manual document checking usually involves considerable costs both in terms of human resources and physical storage of information.

Various software is available in the market that has been developed and provides a fully automated document checking facility that allows a paper document (e.g. a passport) to be placed in a scanner and be automatically checked against the standard features expected.

The checking process includes an ultraviolet light check, an infra-red light check, a read of the chip embedded in the passport, an electronic "visual" check, and a machine-readable data check, a total of 55 different checks are carried out within a few seconds and an automated decision is provided immediately.

Increasingly, business entities are replacing the exchange of negotiable documents in paper form with the exchange of images of those documents and the delivery of a document image itself constitutes an event that triggers a value exchange. For instance, banks in the United States have allowed image exchange for checks. In a check image exchange, the receipt of an image of a check drawn from an account at a bank causes the amount of value identified in the check to be debited from the account.

An important topic in the exchange of any negotiable document is how to make sure that all participants in the exchange are able to determine the validity of the negotiable document. A valid negotiable document requires that all of the information required for negotiability is present and readable, the document itself is not a counterfeit and is not forged or altered.

Further, due to Covid, each professional is hesitant to touch documents. Therefore, there is a need for a system for verifying documents using a multi-step authentication process in a mixed reality environment. Further, the system should enable the verification of the document with minimum contact with the documents.

SUMMARY OF THE INVENTION

In accordance with the teachings of the present invention, a system for authenticating checks using a mixed reality environment is described. The system is made up of a financial instrumentation central database for storing financial and identification data related to the checks, and reality glasses coupled to the financial instrumentation central database The reality glass are made up of a memory unit for storing a plurality of modules, a camera to capture an image of the check, a reality display, and a wearable processor coupled to the memory unit for processing the stored plurality of modules. The wearable processor is coupled to the financial instrumentation central database, and the wearable processor coupled to the camera to process captured images of the check. The reality display is coupled to the camera to overlay the check image. The reality display is coupled to the wearable processor to overlay the processed plurality of modules onto a field of view of a user. The plurality of modules is made up of a first level authentication module to authenticate a bank routing number on the check captured by the camera with the bank routing number stored in the financial instrumentation central database; a second level authentication module to authenticate an account number on the check captured by the camera with the account number stored in the financial instrumentation central database; a third level authentication module to authenticate an appropriate amount on the check, and a fourth level authentication module to authenticate a signature style on the check captured by the camera with the signature style stored in the financial instrumentation central database.

The plurality of modules could further include a fifth level authentication module to verify the personal information of a payor on the check captured by the camera with the personal information of the payor stored in the financial instrumentation central database. In some embodiments, the plurality of modules further includes a sixth level authentication module to verify the bank contact information of a payor on the check captured by the camera with the bank contact information of the payor stored in the financial instrumentation central database. The plurality of modules could further include a seventh level authentication module to verify payee information on the check captured by the camera with the payee information stored in the financial instrumentation central database. The plurality of modules may further include an eighth level authentication module to verify amount in digits matches with the amount in words on the check. In some embodiments, the plurality of modules includes a ninth level authentication module to verify details provided in a memo line. The plurality of modules could further include a tenth level authentication module to verify a date on the check captured by the camera. The plurality of modules may further include an eleventh level authentication module to check the number on the check captured by the camera with the check number stored in the financial instrumentation central database. The plurality of modules may further include an effectuate payment module for automatically effectuating payment on authenticating the check. In some embodiments, the plurality of modules could further include a twelfth level authentication module to biometrically authenticate fingerprints of a payor and a payee of the check by comparing with biometric data stored in the financial instrumentation central database. In still another embodiment, the plurality of modules may further include a thirteenth level authentication module to authenticate micro-printing on the check. The plurality of modules could further include a fourteenth level authentication module to match personal details of a payee with details on the invoice, wherein the reality display displays a list of invoices and a user applies the check to a relevant invoice. The plurality of modules could include any one or more of the levels listed in this paragraph.

A non-transitory computer-readable storage medium is described herein. The storage medium is made up of instructions for authenticating checks using a mixed reality environment and a financial instrumentation central database on a graphical user interface (GUI) of a reality display, which instructions, when executed by a wearable processor, become operational to perform a method. The method includes (1) storing a plurality of modules in a memory unit, (2) capturing an image of the check-in a camera, (3) processing the stored plurality of modules using the wearable processor, wherein the wearable processor coupled to the financial instrumentation central database and to the camera to process captured images of the check, and (4) overlaying the check image and the processed plurality of modules onto a field of view of the user on the reality display. The plurality of modules is made up of a first level authentication module to authenticate a bank routing number on the check captured by the camera with the bank routing number stored in the financial instrumentation central database, a second level authentication module to authenticate an account number on the check captured by the camera with the account number stored in the financial instrumentation central database, a third level authentication module to authenticate an appropriate amount on the check, and a fourth level authentication module to authenticate a signature style on the check captured by the camera with the signature style stored in the financial instrumentation central database.

While a number of features are described herein with respect to embodiments of the inventions; features described with respect to a given embodiment also may be employed in connection with other embodiments. The following description and the annexed drawings set forth certain illustrative embodiments of the inventions. These embodiments are indicative, however, of but a few of the various ways in which the principles of the inventions may be employed. Other objects, advantages, and novel features according to aspects of the inventions will become apparent from the following detailed description when considered in conjunction with the drawings.

BRIEF DESCRIPTION OF DRAWINGS

The annexed drawings, which are not necessarily to scale, show various aspects of the inventions in which similar reference numerals are used to indicate the same or similar parts in the various views.

FIG. 2 illustrates a schematic diagram of a plurality of modules required to authenticate the check;

DETAILED DESCRIPTION OF DRAWINGS

Figure 1:
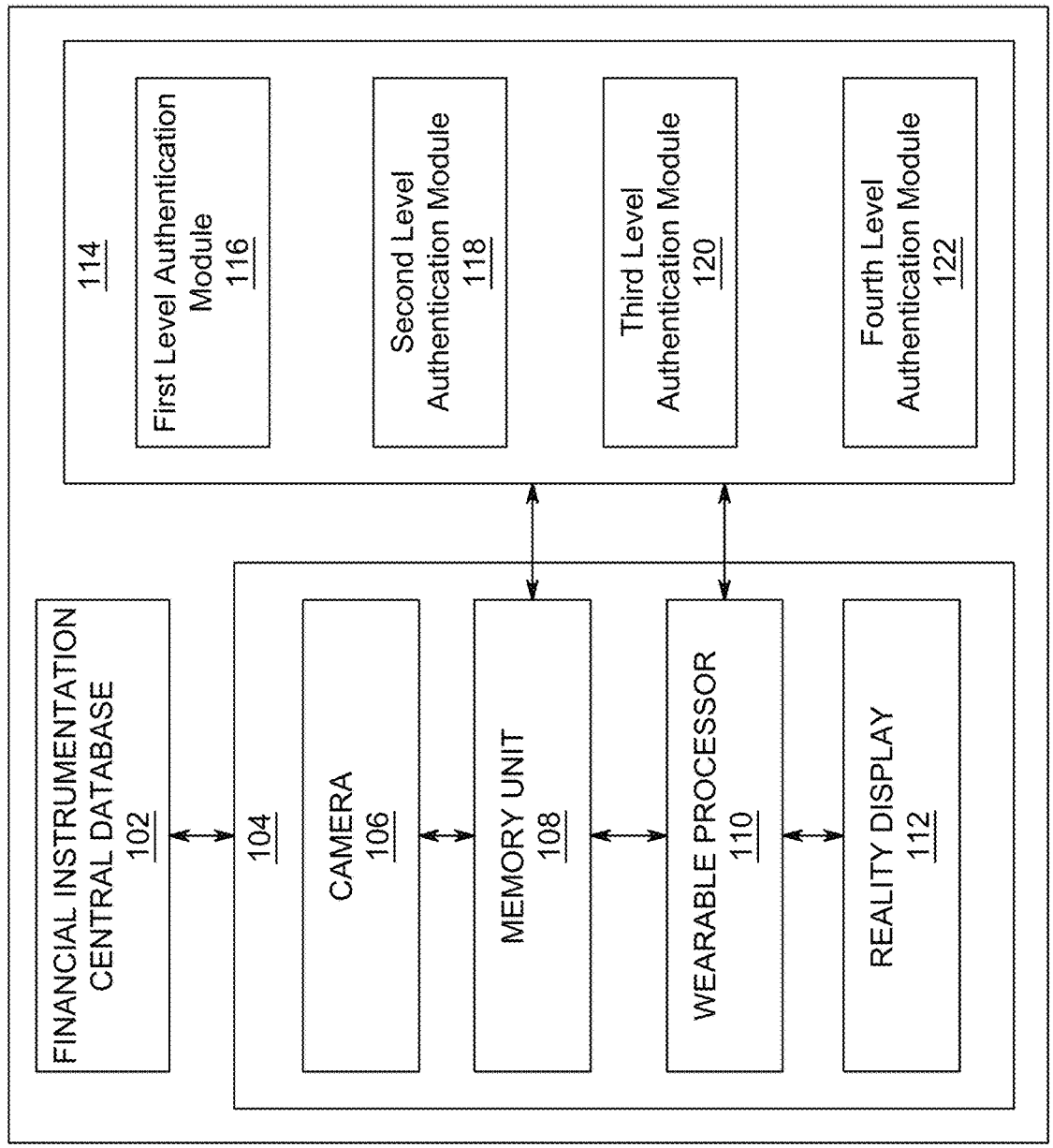
FIG. 1 illustrates a block diagram of a system for authenticating checks using a multi-step authentication process in a mixed reality environment.

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

FIG. 1 illustrates a block diagram of a system 100 for authenticating checks using a mixed reality environment. The system 100 includes a financial instrumentation central database 102 for storing financial and identification data related to the checks, and a reality glasses 104 coupled to the financial instrumentation central database 102.

The financial and identification data related to the checks stored in the financial instrumentation central database 102 include but are not limited to bank routing numbers, account numbers, signature style, personal information of bank account holders, bank contact information, check numbers, etc.

The reality glasses 104 includes a memory unit 106, a camera 108, a wearable processor 110, and a reality display 112. The memory unit 106 is storing a plurality of modules 114. The camera 108 captures the image of the check. The wearable processor 110 is coupled to the memory unit 106 for processing the stored plurality of modules 114. The wearable processor 110 is coupled to the financial instrumentation central database 102.

The wearable processor 110 is coupled to the camera 108 to process captured images of the check. The reality display 112 is coupled to the camera 108 to overlay the check. Further, the reality display 112 is coupled to the wearable processor 110 to overlay the processed plurality of modules 114 onto a field of view of the user. The plurality of modules 114 are explained in detail in conjunction with FIG. 2 of the present invention.

Examples of the financial instrumentation central database 102 and the memory unit 106 include but not limited to a SQL Server, Oracle Database, Sybase, Informix, a cloud server, a content providing server, and an application providing server, and MySQL. Examples of reality glasses 104 include but are not limited to augmented reality, mixed reality, and virtual reality. Examples of the camera 108 include but are not limited to HD camera, wide-angle camera, night mode camera, a digital "point and shoot" camera, etc.

FIG. 2 illustrates a schematic diagram of the plurality of modules required to authenticate the check. The plurality of modules 114 includes a first level authentication module 116, a second level authentication module 118, a third level authentication module 120, and a fourth level authentication module 122.

The first level authentication module 116 authenticates the bank routing number on the check captured by the camera 108 with the bank routing number stored in the financial instrumentation central database 102. The wearable processor identifies the bank routing number and then compares the authenticity or verifies the bank routing number with the bank routing number stored in the financial instrumentation central database.

The second level authentication module 118 authenticates an account number on the check captured by the camera with the account number stored in the financial instrumentation central database. The wearable processor identifies the account number and compares the authenticity or verifies the account number with the account number stored in the financial instrumentation central database.

The third level authentication module 120 authenticates an appropriate amount on the check. The wearable processor identifies the amount on the check and then ensures the amount is appropriate. For exemplary purposes, an appropriate amount may be any numeric number but should not be 0, negative number, or alphanumeric number. The appropriate amount of numbers are stored in the memory unit.

The fourth level authentication module 122 authenticates a signature style on the check captured by the camera with the signature style stored in the financial instrumentation central database. The wearable processor identifies the signature and then authenticates or verifies the signature with the signature stored in the financial instrumentation central database.

The first level authentication module 116, the second level authentication module 118, the third level authentication module 120, and the fourth level authentication module 122, ensures that the check is authenticated and contains authenticated information before effectuating the check.

The bank routing number, the account number, the amount is basic numerical numbers. The camera 108 captures the check image and the wearable processor 110 processes the image and identifies the bank routing number, the account number, and the amount.

In another embodiment of the present invention, the plurality of modules further includes a fifth level authentication module 202 to verify the personal information of a payor on the check captured by the camera with the personal information of the payor stored in the financial instrumentation central database.

The wearable processor identifies the personal information and then authenticates or verifies the personal information with the personal information associated with other check details in the financial instrumentation central database. The personal information contains the name and address of the payor of the check.

In another embodiment of the present invention, the plurality of modules further includes a sixth level authentication module 204 to verify bank contact information of a payor on the check captured by the camera with the bank contact information of the payor stored in the financial instrumentation central database. The bank contact information includes the bank name and the address of the bank.

In another embodiment of the present invention, the plurality of modules further includes a seventh level authentication module 206 to verify payee information on the check captured by the camera with the payee information stored in the financial instrumentation central database. The payee information includes the name of a person or a company or a partnership firm etc. to whom the payor is sending the money.

In another embodiment of the present invention, the plurality of modules further includes an eighth level authentication module 208 to verify amount in digits matches with the amount in words on the check. The wearable processor identifies the digits from the third level authentication module 120 and matches it with the words on the check.

In another embodiment of the present invention, the plurality of modules further includes a ninth level authentication module 210 to verify details provided in the memo line. The memo lines may contain information related to the invoice number, reason for payment, etc. The information on the memo line may be utilized when effectuating the payments.

In another embodiment of the present invention, the plurality of modules further includes a tenth level authentication module 212 to verify the date on the check captured by the camera. The date should not be older and should be appropriate. The appropriate date would be with no alphabets, characters, etc. and without any misprints.

In another embodiment of the present invention, the plurality of modules further includes an eleventh level authentication module 214 to verify the check number on the check captured by the camera with the check number stored in the financial instrumentation central database. The wearable processor identifies the check number and then authenticates or verifies the check number with the check number stored in the financial instrumentation central database.

In another embodiment of the present invention, the plurality of modules further includes an effectuate payment module for automatically effectuating payment on authenticating the check. The wearable processor processes the plurality of modules to verify the authenticity and verification of information on the check to effectuate payments.

In another embodiment of the present invention, the plurality of modules further includes a twelfth level authentication module (not shown in FIGURES) to biometrically authenticate fingerprints of the payor and the payee of the check by comparing with biometric data stored in the financial instrumentation central database. The fingerprints of the payor may be identified from the back of the check and the fingerprint of the payee may be taken before effectuating the payment using the camera of the reality glasses.

In another embodiment of the present invention, the plurality of modules further includes a thirteenth level authentication module to authenticate micro-printing on the check. The microprint authenticates the authenticity of the check.

In another embodiment of the present invention, the plurality of modules further includes a fourteenth level authentication module to match personal details of payee with details on invoice. The reality display displays the list of invoices and a user applies the check to the relevant invoice.

Figure 3:
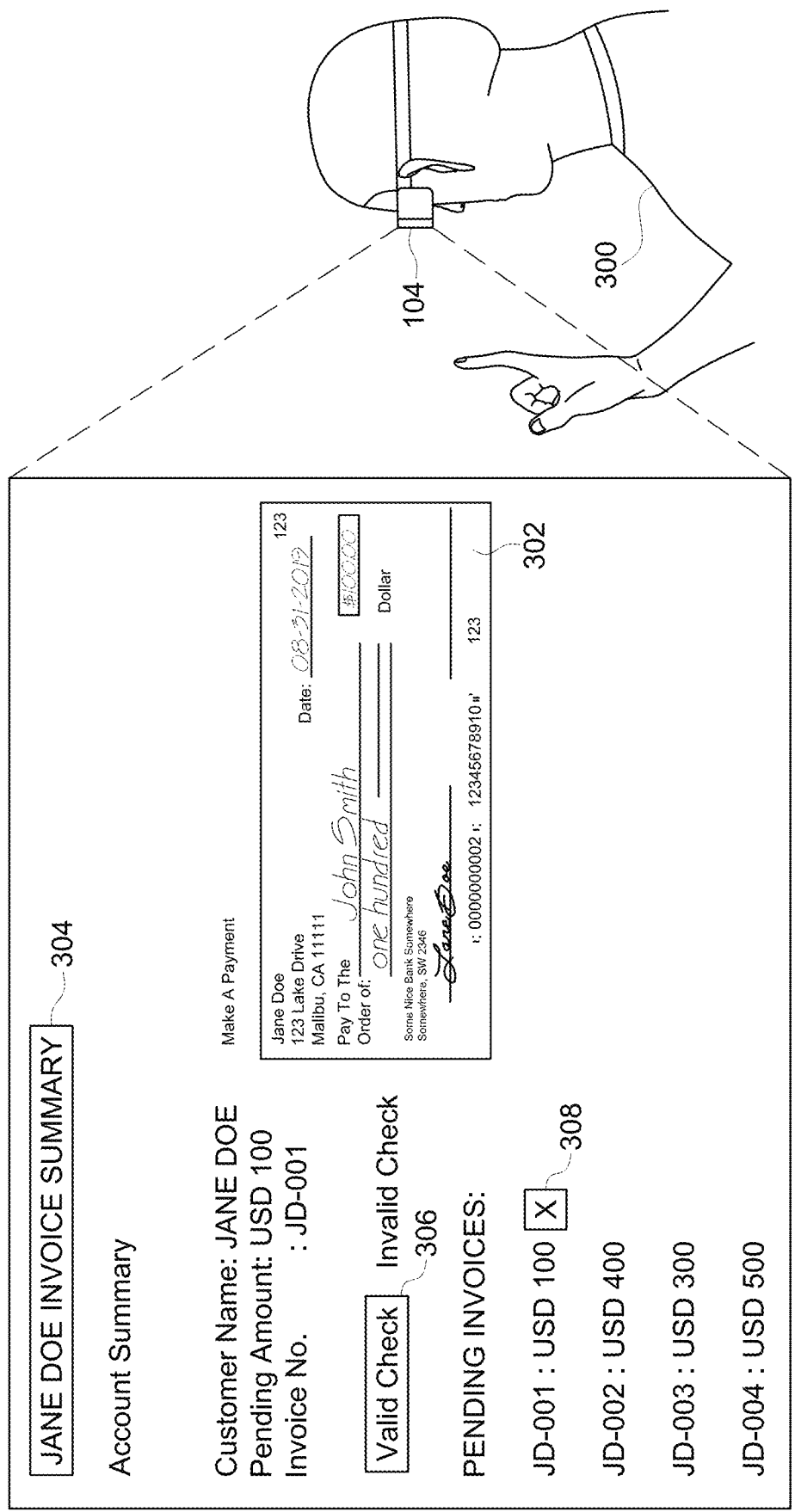
FIG. 3 illustrates a schematic diagram of a user comparing the authenticated checks with an account payment summary.

FIG. 3 illustrates a schematic diagram of a user 300 comparing the authenticated check 302 with an account payment summary 304. The plurality of modules confirms the payee details, bank details, payor details, amount, memo data, etc. to authenticate the check and mark it as a VALID CHECK 306. The effectuate payment module then automatically effectuates the payment.

For exemplary purposes, the account payment summary 304 is of a Jane Doe Invoice Summary 304, which receives a check 302 from John Smith. The system first validates the check and mark it as a Valid Check 306. Further, the system automatically assigns the check to the right invoice 308 by comparing the amount or invoice number from the memo line.

Further, the system is able to retrieve checks from similar names and then compares the amount, invoice number, date, etc. to relate the check to the right person/company. In case, where the system fails to relate the check with the right person/company, the system passes the check to a review module. The review module allows the user to confirm the right person/company associated with the check.

Further, in another embodiment of the present invention, the system includes a neural network machine learning module to automatically update a list of account numbers, routing numbers, payor details, payee details, etc. in the memory unit. The neural network machine learning module brings in artificial intelligence to update the memory unit resulting in quicker effectuation of the checks.

The present application offers various advantages such as the mixed reality application ensures the work is done paperless, no contact to pen or to a desktop/laptop, and thus the entire process is contactless, which is the need of the hour during these COVID/pandemic times. The present application further restricts check fraudulent transactions to avoid monetary losses to people.

It should be appreciated that many of the elements discussed in this specification may be implemented in a hardware circuit(s), a circuitry executing software code or instructions which are encoded within computer-readable media accessible to the circuitry, or a combination of a hardware circuit(s) and a circuitry or control block of an integrated circuit executing machine-readable code encoded within a computer-readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer-readable media, or a combination of a hardware circuit(s) and a circuitry and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above-described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

What is claimed is:

1. A system for authenticating checks using a mixed reality environment, the system comprising:
   a financial instrumentation central database for storing financial and identification data related to the checks;
   a reality glasses coupled to the financial instrumentation central database, the reality glass comprising:
      a memory unit for storing a plurality of modules;
      a camera to capture an image of the check;
      a wearable processor coupled to the memory unit for processing the stored plurality of modules, further the wearable processor coupled to the financial instrumentation central database, further the wearable processor coupled to the camera to process captured images of the check; and
      a reality display coupled to the camera to overlay the check image, further, the reality display coupled to the wearable processor to overlay the processed plurality of modules onto a field of view of a user, wherein the plurality of modules comprising:
         a first level authentication module to authenticate a bank routing number on the check captured by the camera with the bank routing number stored in the financial instrumentation central database;
         a second level authentication module to authenticate an account number on the check captured by the camera with the account number stored in the financial instrumentation central database;
         a third level authentication module to authenticate an appropriate amount on the check; and
         a fourth level authentication module to authenticate a signature style on the check captured by the camera with the signature style stored in the financial instrumentation central database.

2. The system according to claim 1 wherein the plurality of modules further comprising a fifth level authentication module to verify personal information of a payor on the check captured by the camera with the personal information of the payor stored in the financial instrumentation central database.

3. The system according to claim 1 wherein the plurality of modules further comprising a sixth level authentication module to verify bank contact information of a payor on the check captured by the camera with the bank contact information of the payor stored in the financial instrumentation central database.

4. The system according to claim 1 wherein the plurality of modules further comprising a seventh level authentication module to verify payee information on the check captured by the camera with the payee information stored in the financial instrumentation central database.

5. The system according to claim 1 wherein the plurality of modules further comprising an eighth level authentication module to verify amount in digits matches with the amount in words on the check.

6. The system according to claim 1 wherein the plurality of modules further comprising a ninth level authentication module to verify details provided in a memo line.

7. The system according to claim 1 wherein the plurality of modules further comprising a tenth level authentication module to verify a date on the check captured by the camera.

8. The system according to claim 1 wherein the plurality of modules further comprising an eleventh level authentication module to check number on the check captured by the camera with the check number stored in the financial instrumentation central database.

9. The system according to claim 1 wherein the plurality of modules further comprising an effectuate payment module for automatically effectuating payment on authenticating the check.

10. The system according to claim 1 wherein the plurality of modules further comprising a twelfth level authentication module to biometrically authenticate fingerprints of a payor and a payee of the check by comparing with biometric data stored in the financial instrumentation central database.

11. The system according to claim 1 wherein the plurality of modules further comprising a thirteenth level authentication module to authenticate micro-printing on the check.

12. The system according to claim 4 wherein the plurality of modules further comprising a fourteenth level authentication module to match personal details of a payee with details on invoice, wherein the reality display displays a list of invoices and the user applies the check to a relevant invoice.

13. A non-transitory computer-readable storage medium that comprises instructions for authenticating checks using a mixed reality environment and a financial instrumentation central database on a graphical user interface (GUI) of a reality display, which instructions, when executed by a wearable processor, become operational to perform a method comprising:

storing a plurality of modules in a memory unit;

capturing an image of the check in a camera;

processing the stored plurality of modules using the wearable processor, wherein the wearable processor coupled to the financial instrumentation central database and to the camera to process captured images of the check;

overlaying the check image and the processed plurality of modules onto a field of view of the user on the reality display, wherein the plurality of modules comprising:

a first level authentication module to authenticate a bank routing number on the check captured by the camera with the bank routing number stored in the financial instrumentation central database;

a second level authentication module to authenticate an account number on the check captured by the camera with the account number stored in the financial instrumentation central database;

a third level authentication module to authenticate an appropriate amount on the check; and a fourth level authentication module to authenticate a signature style on the check captured by the camera with the signature style stored in the financial instrumentation central database.

14. The method according to claim 13 wherein the plurality of modules further comprising a fifth level authentication module to verify personal information of a payor on the check captured by the camera with the personal information of the payor stored in the financial instrumentation central database.

15. The method according to claim 13 wherein the plurality of modules further comprising a sixth level authentication module to verify bank contact information of a payor on the check captured by the camera with the bank contact information of the payor stored in the financial instrumentation central database.

16. The method according to claim 13 wherein the plurality of modules further comprising a seventh level authentication module to verify payee information on the check captured by the camera with the payee information stored in the financial instrumentation central database; and an eighth level authentication module to verify amount in digits matches with the amount in words on the check.

17. The method according to claim 13 wherein the plurality of modules further comprising a ninth level authentication module to verify details provided in a memo line; and a tenth level authentication module to verify a date on the check captured by the camera.

18. The method according to claim 13 wherein the plurality of modules further comprising an eleventh level authentication module to check number on the check captured by the camera with the check number stored in the financial instrumentation central database; and an effectuate payment module for automatically effectuating payment on authenticating the check.

19. The method according to claim 13 wherein the plurality of modules further comprising a twelfth level authentication module to biometrically authenticate fingerprints of a payor and a payee of the check by comparing with biometric data stored in the financial instrumentation central database; and a thirteenth level authentication module to authenticate micro-printing on the check.

20. The method according to claim 16 wherein the plurality of modules further comprising a fourteenth level authentication module to match personal details of a payee with details on an invoice, wherein the reality display displays a list of invoices and a user applies the check to a relevant invoice.

* * * * *